US011655387B2

(12) United States Patent
Debrauwer et al.

(10) Patent No.: US 11,655,387 B2
(45) Date of Patent: May 23, 2023

(54) THERMOCHROMIC PIGMENT COMPOSITIONS

(71) Applicant: SOCIETE BIC, Clichy (FR)

(72) Inventors: Christelle Debrauwer, Saint Germain sur Morin (FR); Anne-Lise Damiano, Lagny sur Marne (FR); Alexander Bourque, Montevrain (FR); Francois Foulonneau, Bordeaux (FR); Guillaume Chollet, Leognan (FR)

(73) Assignee: Société Bic, Clichy (FR)

( * ) Notice: Subject to any disclaimer, the term of this patent is extended or adjusted under 35 U.S.C. 154(b) by 692 days.

(21) Appl. No.: 16/608,466

(22) PCT Filed: Apr. 24, 2018

(86) PCT No.: PCT/FR2018/051032
§ 371 (c)(1),
(2) Date: Oct. 25, 2019

(87) PCT Pub. No.: WO2018/197808
PCT Pub. Date: Nov. 1, 2018

(65) Prior Publication Data
US 2021/0122936 A1      Apr. 29, 2021

(30) Foreign Application Priority Data

Apr. 27, 2017   (FR) ...................... 1753678

(51) Int. Cl.
*C09D 11/17*      (2014.01)
*C09D 11/18*      (2006.01)
(Continued)

(52) U.S. Cl.
CPC .......... *C09D 11/50* (2013.01); *C09B 67/0097* (2013.01); *C09D 11/17* (2013.01); *C09D 11/18* (2013.01); *C09K 9/02* (2013.01)

(58) Field of Classification Search
CPC ......... C09D 11/17; C09D 11/18; C09D 11/50; C09K 9/02; C09B 67/0097
See application file for complete search history.

(56) References Cited

U.S. PATENT DOCUMENTS 2,503,701 A   4/1950   Mortimer
4,523,207 A   6/1985   Lewis et al.
(Continued)

FOREIGN PATENT DOCUMENTS

CN   105308150 A   2/2016
CN   105566736 A   5/2016
(Continued)

OTHER PUBLICATIONS

N. D. Ghatge, S. S. Mahajan and S. V. Vaidya, Secondary Plasticizers for Polyvinyl Chloride (PVC) Epoxidized Esters, Intern. J. Polymeric Muter., 1983, vol. 10, pp. 121-130 (Year: 1983).*

(Continued)

*Primary Examiner* — Bijan Ahvazi
(74) *Attorney, Agent, or Firm* — Ruggiero, McAllister & McMahon LLC

(57) ABSTRACT

A thermochromic pigment composition including: (A) at least one electron-donor organic dye compound, (B) at least one electron-acceptor compound, and (C) at least one compound corresponding to the following formula (I): in which: X is 0 or a single bond, Z is COO or OCO, $R_1$ is O-alkyl or $(CH_2)_m CH_3$—$R_2$ is $OCO(CH_2)_n CH_3$ or H, —y=0-3, —m=12-18; —p=8-18, and on the condition that, when X is 0, y is other than 0. The thermochromic pigment composition are also useable in thermochromic pigment microcapsules ink compositions including the thermochromic pigment microcapsules, and writing instruments including the ink compositions.

9 Claims, 1 Drawing Sheet

(51) Int. Cl.
  *C09D 11/50* (2014.01)
  *C09K 9/02* (2006.01)
  *C09B 67/02* (2006.01)

(56) References Cited

U.S. PATENT DOCUMENTS

| | | | |
|---|---|---|---|
| 4,720,301 A * | 1/1988 | Kito | B41M 5/305 |
| | | | 503/224 |
| 5,876,492 A | 3/1999 | Malhotra et al. | |
| 9,695,329 B2 | 7/2017 | Ono | |
| 2011/0021678 A1 | 1/2011 | Isozaki et al. | |
| 2012/0202034 A1 | 8/2012 | Morizur et al. | |
| 2012/0227623 A1 * | 9/2012 | Sekiguchi | C09D 11/328 |
| | | | 106/31.32 |
| 2016/0089920 A1 | 3/2016 | Philippe et al. | |
| 2016/0333210 A1 * | 11/2016 | Wang | C09B 11/08 |
| 2019/0382585 A1 | 12/2019 | Debrauwer et al. | |

FOREIGN PATENT DOCUMENTS

| | | |
|---|---|---|
| EP | 3009493 | 4/2016 |
| WO | 2003060001 A2 | 7/2003 |
| WO | 2006002714 A | 1/2006 |
| WO | 2006044337 A | 4/2006 |
| WO | 2013115800 A1 | 8/2013 |
| WO | 2015168389 A1 | 11/2015 |
| WO | 2016198784 | 12/2016 |
| WO | 2016198784 A1 | 12/2016 |

OTHER PUBLICATIONS

International Search Report dated Aug. 10, 2018 for PCT application No. PCT/FR2018/051031.
International Search Report dated Aug. 16, 2018 in corresponding PCT application No. PCT/FR2018/051032, 2 pages.
International Search Report dated Aug. 23, 2018 in related PCT application No. PCT/FR2018/051033, 2 pages.
Amorati et al, "Synthesis of new Cardonal and Cardo derivatives by allylation and regioselctive cyclocarbonylation reactions", Synthesis, No. 18, Jan. 1, 2002, Georg Thieme Verlag, Stuttgart, DE, pp. 2749-2755.
Kaufmann et al, "To know the Cashew-ole II about some derivatives of the main components of the shell folk". Jan. 1, 1967 (Jan. 1, 1967). pp. 577-579.
Chinese Office Action for related Chinese application No. 201880007865.7, 9 pages, dated Nov. 11, 2020.
Japanese Office Action for related Japanese application No. 2019-537252, 5 pages, dated Oct. 11, 2021.
Japanese Office Action for related Japanese application No. 2019-537252, 5 pages, dated Mar. 9, 2022.

* cited by examiner

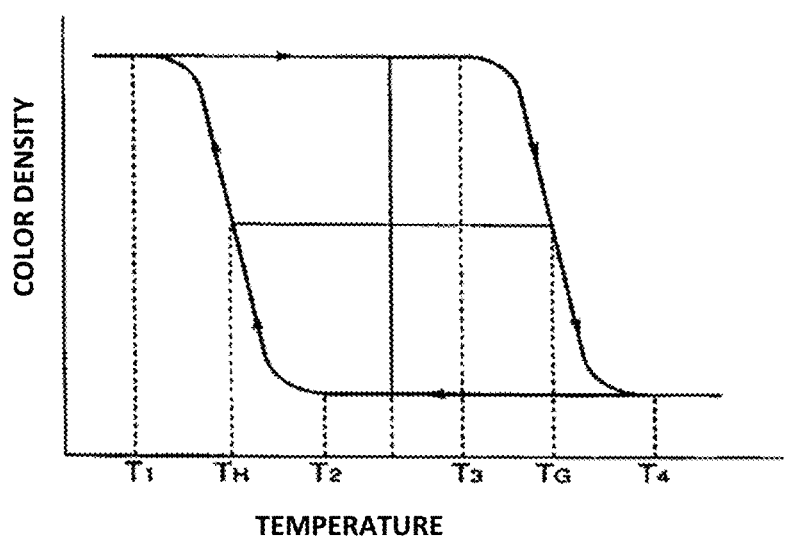

THERMOCHROMIC PIGMENT COMPOSITIONS

This invention regards thermochromic pigment compositions containing specific compounds as a reactive environment. This invention also regards thermochromic pigment microcapsules containing these thermochromic pigment compositions, ink compositions containing such thermochromic pigment microcapsules, and finally writing instruments containing such ink compositions.

STATE OF THE PRIOR ART AND PURPOSE OF THE INVENTION

The thermochromic pigment compositions present reversable bleaching properties related to a change in temperature. These compositions are use when an ink marking requires repeated erasures.

The thermochromic effect of an ink works using the three following compounds:
- (A) At least one electron-donor or lueco organic dye compound,
- (B) At least one electron-acceptor or color developer compound, and
- (C) At least one compound serving as a reactive environmental that can drive a reversible electron acceptance/donation attributable to the compounds (A) and (B) or a temperature change regulator agent.

The changes in temperature cause the ink to discolor or take color reversibly. Thus, the increased heat will cause the erasure of the ink, whereas cooling will cause it to appear.

These changes follow the diagram in FIG. 1. On this diagram, the temperature at which the color starts fading is T3, that at which the color of the ink is totally gone is T4, and TG is the middle temperature between T3 and T4. On the other hand, the temperature at which the ink starts to come back is T2, that at which the ink is completely back is T1, and TH is the middle temperature between T1 and T2. The range between (TH) and (TG) is called the color change hysteresis width (ΔH).

Surprisingly, the inventors discovered specific compounds that can be used as a reactive environment in thermochromic pigment compositions, the said compositions allowing the thermochromic pigment microcapsules to be prepared, presenting optimal condensation and crystallization temperatures that correspond respectively to the discoloration and recoloration temperatures of these compositions. The compounds of the invention thus present numerous advantages to be used as the change regulator agent as well as several advantages to be used as a temperature change regulator agent in thermochromic inks: they present remarkable hysteresis characteristics and an extremely high contrast in color between the colored and discolored states. Furthermore, the new compounds of the invention had the advantage of being able to be prepared through an ecological procedure, meaning from a recycled and bio-based product, 3-pentadecylcyphenol, taken from the waste of the production of cashew nuts.

DESCRIPTION OF THE INVENTION

According to a first aspect, the purpose of this invention is the composition of a thermochromic pigment, containing:
- (A) at least one electron-donor dye compound,
- (B) at least one electron-acceptor compound, and
- (C) at least one compound corresponding to the following formula (I):

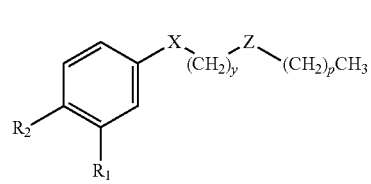

In which:
X represents O or a single bond
Z represents COO or OCO
$R_1$ represents O-alkyl or $(CH_2)_m CH_3$,
$R_2$ represents $OCO(CH_2)_n CH_3$ or H,
y=0-3,
m=12-18,
n=12-18,
p=8-18, and
in the condition that when X is 0, y does not equal 0.

In the sense of the present invention:
when Z=OCO: the oxygen atom is attached to the group $(CH_2)$, and the carbonyl group to the chain $(CH_2)_p CH_3$, and
when Z=COO: the carbonyl group is attached to the chain $(CH_2)_y$ and the oxygen atom to the chain $(CH_2)_p CH_3$.

In the formula (I) above, X is preferably a single bond and Z preferably represents OCO.

In the formula (I) above, y can be independently chosen among one of the following whole numbers: 0, 1, 2 or 3.

In the formula (I) above, m can be independently chosen among one of the following whole numbers: 12, 13, 14, 15, 16, 17 or 18.

In the formula (I) above, n can be independently chosen among one of the following whole numbers: 12, 13, 14, 15, 16, 17 or 18.

In the formula (I) above, p can be independently chosen among one of the following whole numbers: 8, 9, 10, 11, 12, 13, 14, 15, 16, 17 or 18.

According to a preferred embodiment, the compound (C) of the invention corresponds to the following formula ($I_a$):

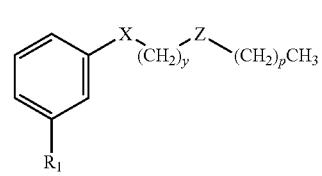

in which:
X represents O or a single bond
Z represents COO or OCO
$R_1$ represents $O—C_{1-6}$alkyl or $(CH_2)_m CH_3$,
y=0-3
m=12-18, and
p=8-18.

Favorably, in the formula ($I_a$) of the invention, X is a single bond, Z preferably represents OCO, and y=0.

Favorably, in the formula ($I_a$) of the invention, $R_1$ represents $(CH_2)_m CH_3$.

According to an even more preferred embodiment, in the formula ($I_a$) above:
X is a single bond,
Z represents OCO,
$R_1$ represents $(CH_2)_m CH_3$,
y=0
m=12-18, and
p=8-18.

The compounds of formula (I) of the invention can be synthesized following four different synthesis pathways.

The first synthesis pathway responds to the following reactional diagram:

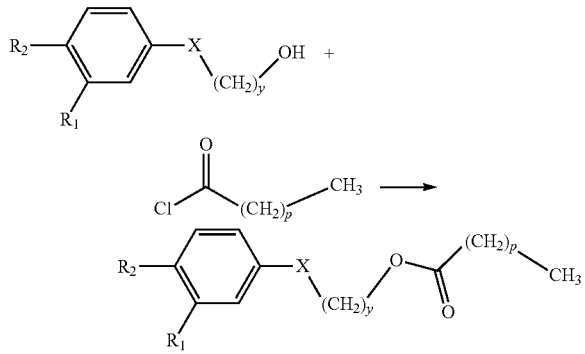

In this first synthesis pathway, alcohol is solubilized with a catalyzer in an aprotic polar solvent, such as tetrahydrofuran (THF). The catalyzer is preferably a volatile base like triethylamine. The mixture is kept cold, at a temperature going from −20 to 20° C., preferably from 0 to 20° C. The mixture is kept cold in an ice bath or a solid $CO_2$ bath immersed in a solvent such as acetone or ethanol. The mixture is advantageously rendered inert with the addition of nitrogen. The acid chloride is then slowly added, preferably drop by drop, for a duration going from 15 to 60 minutes, preferably over 30 minutes. The alcohol/acid chloride ratio used is preferably from 1.1/1 to 1/1.1 and ideally of 1/1. The temperature is then increased to room temperature (25° C.), and the mixture is kept at this temperature for 1 to 3 hours, preferably for 2 hours, while stirring. The compound of formula (I) obtained is then purified by recrystallization.

The second synthesis pathway corresponds to the following reactive diagram:

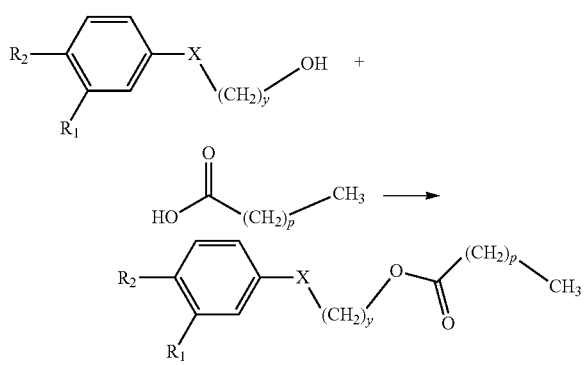

In this second synthesis pathway, the alcohol has a condensation point lower than 60° C. and serves as a solvent. It is used in excess, preferably with an alcohol/carboxylic acid ratio of 1.5/1 to 3/1, and ideally of 2/1. The alcohol and carboxylic acid mixture is heated in the presence of a catalyzer with a temperature ranging from 120 to 200° C., and preferably from 140 to 160° C., under reduced pressure, preferably from 200 to 800 mbar, until the acid is totally consumed. The catalyzer is preferably a water-soluble acid, such as paratoluenesulfonic acid. The compound of formula (I) obtained is then purified by recrystallization.

The third synthesis pathway corresponds to the following reactive diagram:

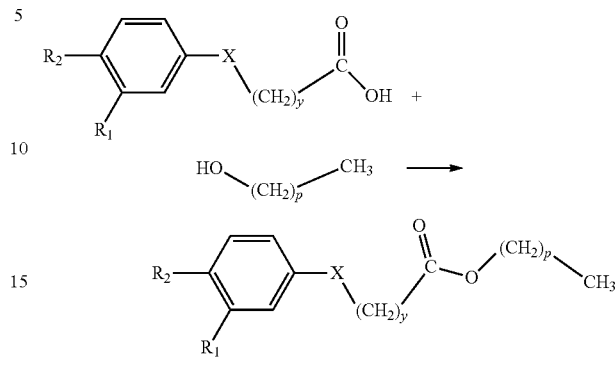

In this third synthesis pathway, alcohol has a condensation point lower than 60° C. and acts as a solvent. It is used in excess, preferably with an alcohol/aromatic acid ratio of 1.5/1 to 3/1, and ideally of 2/1. The mixture of alcohol and aromatic acid is heated in the presence of a catalyzer with a temperature ranging from 120 to 200° C., and preferably from 140 to 160° C., under reduced pressure, preferably from 200 to 800 mbar, until the acid is totally consumed. The catalyzer is preferably a water-soluble acid, such as para-toluenesulfonic acid. The compound of formula (I) is then purified by recrystallization.

The fourth synthesis pathway responds to the following reactive diagram:

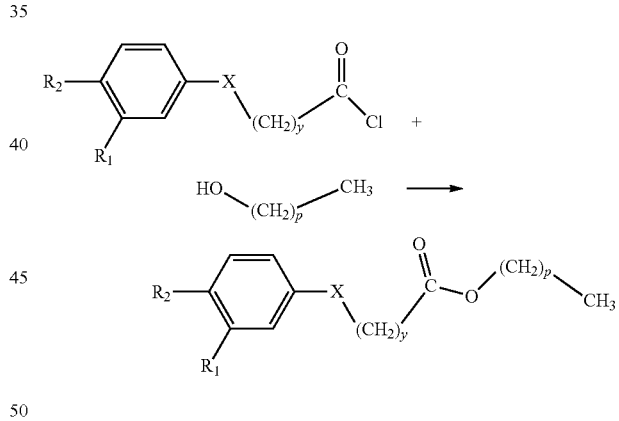

In this fourth synthesis pathway, alcohol is solubilized with a catalyzer in an aprotic polar solvent, such as tetrahydrofuran (THF). The catalyzer is preferably of a volatile base, such as triethylamine. The mixture is kept cold at a temperature ranging from −20 to 20° C., preferably from 0 to 20° C. The mixture is kept cold in an ice bath or a solid $CO_2$ bath immersed in a solvent such as acetone or ethanol. The mixture is advantageously rendered inert with the addition of nitrogen. Acid chloride is then added slowly, preferably drop by drop, for a duration going from 15 to 60 minutes, preferably 30 minutes. The alcohol/acid chloride ratio used is preferably 1.1/1 to 1/1.1, and ideally of 1/1. The temperature is then raised to room temperature (25° C.), and the mixture kept at this temperature for 1 to 3 hours, preferably for 2 hours, while stirred. The compound of formula (I) obtained is then purified by recrystallization.

The compound of formula (I) of the invention is preferably chosen among the following compounds:

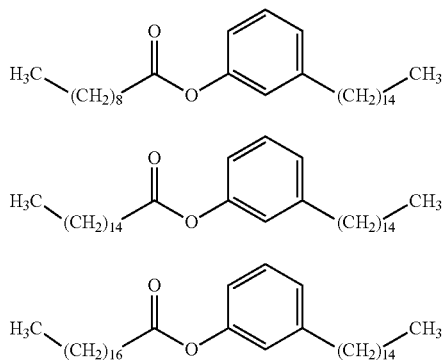

The compound of formula (I) of the invention can vary from 20 to 80° C., preferably from 30 to 80° C., and ideally from 40 to 70° C. It is this optimal condensation temperature that makes the compound of formula (I) of the invention an ideal compound that presents the required properties to be used as a temperature change regulator agent in the thermochromic pigment compositions.

In the thermochromic pigment composition of the invention, the weight percentages of the compounds (A), (B), and (C) vary based on the nature and concentration of each of these compounds.

The weight percentage of the electron-donor dye compound (A) can vary from 1 to 10%, preferably from 1 to 6%, and ideally from 2 to 4%, by weight compared to the total weight of the thermochromic pigment composition.

The weight percentage of the electron-acceptor compound (B) can vary from 1 to 20%, preferably from 1 to 14%, and ideally from 4 to 10%, by weight with regard to the total weight of the thermochromic pigment composition.

The weight percentage of the compound (C) of formula (I) acting as a reactive environment can vary from 70 to 98%, preferably from 80 to 98%, and ideally from 86 to 94%, by weight with regard to the total weight of the thermochromic pigment composition.

Thus, the thermochromic pigment composition of the invention can include:
(A) from 1 to 10%, preferably from 1 to 6%, and ideally from 2 to 4%, by weight of at least one electron-donor organic compound,
(B) from 1 to 20%, preferably from 1 to 14%, and ideally from 4 to 10%, by weight of at least one electron-acceptor compound, and
(C) from 70 to 98%, preferably 80 to 98%, and ideally from 86 to 94%, by weight of at least one compound corresponding to the formula (I).

According to an embodiment, the thermochromic pigment composition of the invention includes:
(A) 2 to 4% by weight of at least one electron-donor organic compound,
(B) 4 to 10% by weight of at least one electron-acceptor compound, and
(C) 86% to 94% by weight of at least one compound corresponding to formula (I).

Advantageously, the thermochromic pigment composition of the invention presents a color-change hysteresis width ($\Delta H$) after encapsulation ranging from 20 to 80° C., preferably from 30 to 80° C., and ideally from 40 to 70° C.

As an electron-donor organic compound dye (A), the traditionally known compounds such as the diphenylmethane phthalides, phenylindolyl phthalides, indolyphthalides, diphenylmethane azaphthalides, phenylindolyl azaphthalides, fluoranes, styrylquinolines and diazarhodamine lactones can be cited, two examples of these compounds being present below.

The electron-donor organic compound dye (A) can also be chosen from the 3-(4-diethylamino-2-ethoxyphenyl)-3-(1-ethyl-2-methylindol-3-yl)-4-azaphthalide (Blue 63, CAS No.: 1552-42-7), the 2'-chloro-6'-(diethylamino)-3'-methylfluorane (Cas No.: 21121-62-0), 6'-(diethylamino)-1,3'-dimethylfluorane (Cas No.: 21934-68-9), 2-chloro-6-(diethylamino)-fluorane (CAS No.: 26567-23-7), 3-diathylaminobenzofluorane (CAS No.: 26628-47-7), 3',6'-bis(diethylamino)-2-(4-nitrophenyl)spiro[isoindole-1,9'-xanthene]-3-one (CAS No.: 29199-09-5), 2-phenylamino-3-methyl-6-diethylaminofluorane (CAS No.: 29512-49-0), 2'-(dibenzylamino)-6'-(diethylamino)fluorane (CAS No.: 34372-72-0), 2-(2,4-dimethylphenylamino)-3-methyl-6-diethlaminofluorane (Black 15, CAS No.: 36431-22-8), 3-(1,2-dimethyl-3-indolyl)-3-[4-(dimethylamino)-2-methylphenyl] phtalide (CAS No.: 36499-49-7), 3',6'-dimethoxyfluorane (CAS No.: 36886-76-7), 3,3-bis-(1-butyl-2-methyl-indol-3-yl)-3H-isobenzofuran-1-one (red 40, CAS No.: 50292-91-6), 3,3-bis-(2-methyl-1-octyl-1H-indol-3-yl)-3H-isobenzofuran-1-one (CAS No.: 50292-95-0), 2'-anilino-6'-[ethyl(p-tolyl)amino]-3'-methylspiro[isobenzofuran-1(3H),9'-[9H] xanthene]-3-one (CAS No.: 59129-79-2), 3-(N-ethyl-n-isopentylamino)-6-methyl-7-anilino fluorene (CAS No.: 70516-41-5), 3-[4[(diethylamino)phenyl]-3-(1-ethyl-2-methyl-1H-indol-3-yl)phthalide (CAS No.: 75805-17-3), 2'-(2-chloroanilino)-6'-(dibutylamino)fluorane (CAS No.: 82137-81-3), 2-phenylamino-3-methyl-6-dibutylaminofluorane (CAS No.: 89331-94-2) 3-(1-butyl-2-methyl-1H-indol-3-yl)-6-(dimethylamino)-3-[4-(dimethylamino)phenyl]-3-(1 (3H)-isobenzofuranone (CAS No.: 92453-31-1), 7-(4-diethylamino-2-hexyloxyphenyl)-7-(1-ethyl-2-methyl-1H-indol-3-yl)-7H-furo[3,4-b]pyridine-5-one (Blue 203, CAS No.: 98660-18-5) 7,7-bis[4(diethylamino)-2-ethoxyphenyl] furo[3,4-b]pyridine-5-one (CAS No.: 132467-74-4), N,N-dimethyl-4-[2-[20(octyloxy)phenyl]-6-phenyl-4-pyrindinyl] benzenamine (Yellow CK37, CAS No.: 144190-25-0), 3-(2, 2-bis(1-ethyl-2-methylindol-3-yl)vinyl)-3-(4-diethylaminophenyl)-phthalide (CAS No.: 148716-90-9).

Preferably, the electron-donor organic compound dye (A) is chosen from 3-(4-diethylamino-2-ethoxyphenyl)-3-(1-ethyl-2-methylindol-3-yl)-4-azaphthalide (Blue 63, CAS No.: 69898-40-4) 2'-(dibenzylamino)-6'-(diethylamino)fluorane (CAS No.: 34372-72-0), N,N-dimethyl-4-[2-[2-(octyloxy)phenyl]-6-phenyl-4-pyridinyl]benzenamine (Yellow CK37, CAS No.: 144190-25-0), 7-(4-diethylamino-2-hexyloxyphenyl)-7-(1-ethyl-2-methyl-1H-indol-3-yl)-7H-furo[3, 4-b]pyridine-5-one (Blue 203, CAS No.: 98660-18-5), 2-(2, 4-dimethylphenylamino)-3-methyl-6-diethylaminofluoran (Black 15, CAS No.: 36431-22-8), and 3,3-bis-(1-butyl-2-methyl-indol-3-yl)-3H-isobenzofuran-1-one (Red 40, CAS No.: 50292-91-6).

As an electron-acceptor compound (B) we can provide a non-exhaustive list of the compounds with an active proton, such as the compounds with a phenolic hydroxyl group (monophenols or polyphenols), their derivatives that have substitutes, such as an alkyl group, an aryl group, an acyl group, an alcoxycarbonyl group, a carboxy group, their esters, an amido group or a halogen atom, and the condensed phenol-aldehyde resins such as bisphenols or trisphenols.

In the sense of this invention, the following are defined as:

Alkyl: a saturated hydro-carbonated aliphatic group, linear or ramified, in $C_1$-$C_{20}$, preferably in $C_1$-$C_{12}$, more preferably in $C_1$-$C_8$, and ideally in $C_1$-$C_4$. The term "ramified" means that at least one lower alkyl group, such as a methyl or ethyl, is carried by a linear alkyl chain. Examples of alkyl groups are methyl, ethyl, n-propyl, i-propyl, n-butyl, t-butyl and n-pentyl.

Aryl: any functional group or substitution derived from at least one aromatic cycle; an aromatic cycle corresponds to the whole mono- or polycyclic group plan including a delocalized TT system, in which each atom of the cycle contains an orbital p, the said orbitals p covering one another; examples of these aryl groups are: phenyl, biphenyl, naphthalene and anthracene. The aryl groups of the invention preferably contain 4 to 12 carbon atoms, and ideally 5 to 6 carbon atoms. Ideally, the aryl group of the invention is a phenyl group.

Thus, the electron-acceptor compound (B) can be chosen from the 2,2-bis-(4-hydroxy-3-methylphenyl)propane (Bisphenol C, CAS No.: 79-97-0), the 4-hexyl-1,3-dihydroxybenzene (4-hexylresorcinol, CAS No.: 136-77-6), 4,4'-cyclohexylidenebisphenol (BPZ, Cas No.: 843-55-0), 4,4'-(hexafluoroisopropylidene)diphenol (Bisphenol AF, CAS No.: 1478-61-1), 4,4'-(1-phenylethylidene)bisphenol (CAS No.: 1571-75-1), 2,2'-dihydroxybiphenyl (CAS No.: 1806-29-7), 4,4'-ethylidenebisphenol (CAS No.: 2081-08-5), 4,4'-(1,4-phenylenediisopropylidene)bisphenol (CAS No.: 2167-51-3), 1,1-bis(4-hydroxy-3-methylphenyl)cyclohexane (CAS No.: 2362-14-3), 9,9-bis(4-hydroxyphenyl)fluorene (CAS No.: 3236-71-3) 4,4'-(1,3-phenylenediisopropylidene)bisphenol (CAS No.: 13595-25-0) 1,1,1-tris(4-hydroxyphenyl)ethane (CAS No.: 27955-94-8), 4,4'-(2-ethylhexylidene)diphenol (CAS No.: 74462-02-5) a,a,a'-tris(4-hydroxyphenyl)-1-ethyl-4-isopropylbenzene (CAS No.: 110726-28-8), 4-(1,1,3,3-tetramethylbutyl)phenol (CAS No.: 14763-60-1), 4-hydroxyphenyl-4-isopropoxyphenyl sulfone (CAS No.: 95235-30-6), 4,4'-dihydroxybiphenyl (Cas No.: 92-88-6), 4-hydroxybiphenyl (Cas No.: 92-693), p-hydroxycumene (CAS No.: 99-89-8), 2,4-dihydroxybenzophenone (CAS No.: 131-56-6), hydroquinone monomethylether (MEHQ, CAS No.: 150-76-5), 3-n-pentadecylphenol (CAS No.: 501-24-6), 4-(2-phenylisopropyl)phenol (CAS No.: 599-64-4), 5-chloro-2(2,4-dichlorophenoxy)phenol (CAS No.: 3380-34-5), N-(p-toluenesulfonyl)-N'-(3-(-p-toluenesulfonyloxy)phenyl) urea (CAS No.: 232938-43-1), 2,2-bis(3,5-dibromo-4-hydroxyphenyl)propane (CAS No.: 79-94-7), 4,4'-isopropylidenediphenol (CAS No.: 80-05-7) and the 4,4'-sulfonyldiphenol, (BPS, CAS No.: 80-09-1).

Preferably, the electron-acceptor compound (B) is chosen among the 2,2-bis(4-hydroxy-3-methylphenyl)propane (Bisphenol C, CAS No.: 79-97-0), 4-hexyl-1,3-dihydroxybenzene (4-hexylresorcinol, CAS No.: 136-77-6), 4,4'-cyclohexylidenebisphenol (BPZ, CAS No.: 843-55-0), 4,4'-(hexafluroisopropylidene)diphenol (Bisphenol AF, CAS No.: 1478-61-1) 4,4'-(1-phenylethylidene)bisphenol (CAS No.: 1571-75-1), 2,2'-dihydroxybiphenyl (CAS No.: 1806-29-7), 4,4'-(1,4-phenylenediIsopropylidene) bisphenol (CCAS No.: 2167-51-3), 1,1-bis(4-hydroxy-3-methylphenyl)cyclohexane (CAS No.: 2362-14-3), 9,9-bis(4-hydroxyphenyl)fluorene (CAS No.: 3236-71-3), 4,4'-(1,3-phenylenediisopropylidene)bisphenol (CAS No.: 13595-25-0), 1,1,1-tris(4-hydroxyphenyl)ethane (CAS No.: 27955-94-8), 4,4'-(2-ethylhexylidene)diphenol (CAS No.: 74462-02-5), and a,a,a'-tris(4-hydroxyphenyl)-1-ethyl-4-isopropylbenzene (CAS No.: 110726-28-8), The thermochromic pigment composition of the invention is prepared by dissolving the compounds (A) and (B) in the compound (C) of the formula (I) of the invention, then stirring until a homogenous mixture is obtained, using a mixer like a homogenizer or a disperser.

The compounds (A) and (B) thus associated with the compound of formula (I) of the invention can be formulated in microcapsules. Thus, the thermochromic pigment composition of the invention is encapsulated in microcapsules to form thermochromic pigment microcapsules. Such thermochromic pigment microcapsules have another purpose according to the invention. They have advantageous features in that they are resistant to mechanical restrictions, they are insoluble and therefore dispersible in water, and they agglomerate slowly.

The condensation temperature (discoloration temperature T4) of the thermochromic pigment microcapsules of the invention can vary from 20 to 80° C., preferably from 30 to 80° C., and ideally from 40 to 70° C.

The crystallization temperature (or recoloration temperature T1) of the thermochromic pigment microcapsules of the invention can vary from −40 to 20° C., preferably from −30 to 10° C., and ideally from −20 to 0° C.

The thermochromic pigment microcapsules of the invention have an average diameter ranging from 0.5 to 30 µm, preferably 1 to 10 µm, and ideally from 3-5 µm. This average diameter corresponds to d90 in volume and means that 90% of the volume of the microcapsules are made up of microcapsules with a size within the indicated interval. This average diameter can be determined by laser granulometry by using a Zetasizer Nano ZS device by Malvern Instruments.

The micro-encapsulation procedures used include but are not limited to the conventional methods, such as:

Chemical procedures that rely on the in-situ formation of the coating microcapsules, such as by polymerization or interfacial polycondensation, these procedures being the preferred ones, Physico-chemical procedures, for example by separation of phases or coacervation, by evaporation-extraction of the solvent, by hot melt Mechanical procedures, for example by spray drying, melting or freezing of drops, or spray-coating.

The thermochromic pigment microcapsules of the invention are advantageously based on amino resin, and preferably based on melamine resin, urea resin or benzoguanamine resin.

The thermochromic pigment microcapsules of the invention are preferably prepared by in-situ polymerization from melamine resin.

Another purpose of the invention regards an ink composition containing thermochromic pigment microcapsules according to the invention.

The thermochromic pigment microcapsules of the invention present within the ink composition represent 5 to 50% by weight of the total weight of the ink composition.

Furthermore, the ink composition of the invention is largely composed of water. Advantageously, water represents 40 to 80% by weight of the total weight of the ink composition.

The ink composition of the invention can also contain one or several water-miscible co-solvents. Thus, the ink composition of the invention can contain an organic or aqueous solution, preferably an aqueous solvent.

Examples of the solvents that can be added to the ink composition of the invention are water and water-miscible polar solvents, such as:

Alcohols: linear or ramified alcohols in $C_1$-$C_{15}$ such as isopropanol, butanol, isobutanol, pentanol, benzylic alcohol; glycerin; diglycerin; polyglycerin, Esters such as ethyl acetate or propyl acetate, Carbonate esters such as propylene carbonate or ethylene carbonate, Ketones such as methylisobutylketone (MIBK), acetone or cyclohexanone, Glycols such as glycol ethylene, glycol diethylene, glycol triethylene, glycol propylene, glycol polyethylene, ether monomethyl globcol ethylene, glycol 3-butylene and glycol thiodiethylene, Amides such as dimethylacetamide or dimethylformamide, and Their mixture.

The solvents represent 5 to 20% by weight of the total weight of the ink composition.

The ink composition of the invention can also contain one or more specific adjuvants that can play different roles based on the final intended use. These uses can regard printing ink by serigraphy, offset printing, rotogravure printing, spray coating, electrostatic coating, electrodeposition coating, roll coating, inkjet printing, inks for writing tools like ballpoint pens, ink pens, markers and color pencils. The ink composition of the invention can also be added to a thermoplastic resin composition or thermosetting composition to made molds.

Examples of the above-mentioned adjuvants are:

Rheology modifiers (rheofluidifying agent) capable of creating a gel effect, like xanthan gum or Arabic gum, Defoamers, such as modified aqueous polysiloxane dispersions (Synthron MOUSSEX®), pH regulators, such as sodium hydroxide, triethanolamine, Surfactants, such as polyol polyethers (TERGITOL™ by DOW), Biocides, such as isothiazolinones (ACTICIDE® by Thor), Anticorrosive agents, such as benzotriazole, Lubricants, Dispersants, Coalescence agents, Cross-linking agents, Wetting agents, Plasticizers, Antioxidants, UV stabilizers.

An additional purpose of the invention regards writing instruments containing an ink composition according to the invention. These instruments generally comprise a body containing the ink composition of the invention, and eventually a scrubbing agent. The writing instrument according to the invention is favorably chosen from ballpoint pens, color pencils, chalk, and ideally chosen from friction erasable ballpoint pens. The scrubbing element of the writing instrument is preferably an eraser.

The ink composition can be applied to paper, fibers, leather, plastic, glass, metal, wood, concrete.

Other than the above provisions, the invention also includes other provisions that arise from the additional description below, which is connected to the synthesis of the formula compound (1) according to the invention, in their characterization and their use as a temperature change regulator agent in thermochromic pigment compositions.

EXAMPLES

Compounds (1), (2) and (3) of the following formulas:

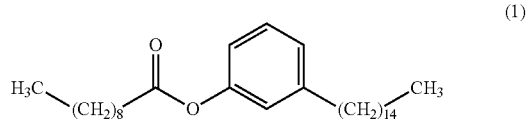

(1)

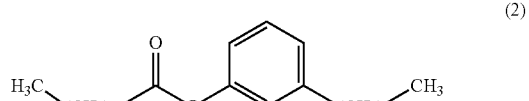

(2)

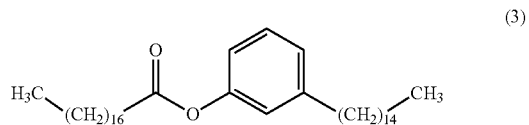

(3)

are prepared according to the following protocols:

Synthesis of the Compound (1)

15.9 of 3-pentadecylphenol (CAS No. 501-24-6) and 5.8 g of triethylamine (CAS No. 121-44-8) are solubilized in 250 mL of tetrahydrofuran (CAS No. 109-99-9). The reactive environment is kept at room temperature and is rendered inert by the addition of nitrogen. 10 g of decanoyl chloride (CAS No. 112-13-0) are added drop by drop for 15 minutes. After this addition, the reactive environment is stirred for 30 minutes at room temperature.

The reactive environment is then extracted with 100 mL of ethyl acetate. The organic phase is recovered and washed with three times 150 mL of water. The organic phase is then dried on sodium sulphate and the solvent is evaporated.

The product is recrystallized twice by ethanol. The analysis by gaseous-phase chromatography (GPC) of the product obtained shows that the product is 98% pure.

Synthesis of the Compound (2)

11.1 g of 3-pentadecylphenol (CAS No. 501-24-6) and 4.0 g of triethylamine (CAS No. 121-44-8) are solubilized in 150 mL of tetrahydrofuran (CAS No. 109-99-9).

The reactive environment is kept at room temperature and is rendered inert by the addition of nitrogen. 10 g of palmitoyl chloride (CAS No. 112-67-4) are added drop by drop for 15 minutes. At the end of the addition, the reactive environment is stirred for 30 minutes at room temperature.

The reactive environment is then extracted with 100 mL of ethyl acetate. The organic phase is recovered and washed with three times 150 mL of water. The organic phase is then dried on sodium sulphate and the solvent is evaporated.

The product is recrystallized once by ethanol and once by isopropanol. The analysis by gaseous-phase chromatography (GPC) of the product obtained shows that the product is 94% pure.

Synthesis of the Compound (3)

10.0 g of 3-pentadecylphenol (CAS No. 501-24-6) and 3.7 g of triethylamine (CAS No. 121-44-8) are solubilized in 150 mL of tetrahydrofuran (CAS No. 109-99-9). The reactive environment is kept at 5° C. and is rendered inert by the addition of nitrogen. 10 g of stearoyl chloride (CAS No. 112-76-5) are added drop by drop for 15 minutes. At the end of the addition, the reactive environment is stirred for 30 minutes at room temperature.

The reactive environment is then extracted with 100 mL of ethyl acetate. The organic phase is recovered and washed with three times 150 mL of water. The organic phase is then dried on sodium sulphate and the solvent is evaporated.

The product is recrystallized twice by ethanol. The analysis by gaseous-phase chromatography (GPC) of the product obtained shows that the product is 98% pure.

The condensation temperatures $T_{FUS}$ of the compounds (1), (2) and (3) obtained are measured by differential scanning calorimetry (DSC) using a device TA Instruments Q20 on a temperature range going from −50 to 100° C., at heating/cooling speeds of +/−20° C./minute. The temperatures measured are indicated in Table 1 below.

TABLE 1

| Formula compound (I) | $T_{FUS}$ (° C.) |
|---|---|
| Compound (1) | 30 |
| Compound (2) | 47 |
| Compound (3) | 48 |

Preparation of a Thermochromic Pigment Composition:

A thermochromic pigment composition is prepared by mixing 2.2 parts by weight of 3-(4-diethylamino-2-ethoxyphenyl)-3-(1-ethyl-2-methylindol-3-yl)-4-azaphthalide (compound (A), CAS No.: 69898-40-4), 2.2 parts by weight of 4,4'-(hexafluoroisopropylidene)diphenol (compound (B1) CAS No.: 1478-61-1), 2.2 parts by weight of 2,2-bis(4-hydroxy-3-methylphenyl)propane (compound (B2), CAS No.: 79-97-0), and 93.4 parts by weight of the compound (3) prepared beforehand (compound (C)):

(3)

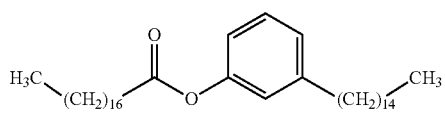

The mixture obtained is heated and stirred at a temperature of 110° C. for 45 minutes, until the compounds (A), (B1) and (B2) are fully solubilized in the compound (C).

Preparation of the Thermochromic Pigment Microcapsules:

7.2 parts by weight of an aqueous solution of an anhydride maleic copolymer and methylvinylether (solution at 33% by weight of copolymer) are neutralized with 8.4 parts by weight of a sodium hydroxide aqueous solution (solution at 1.0 M). This solution is diluted with 42.0 parts by weight of water, and the mixture emulsified with a homogenizer at a speed of at least 15 m·s$^{-1}$. 26.0 parts by weight of the previously prepared thermochromic pigment composition are added, and the emulsion obtained is now at a temperature of 85° C. for 30 minutes. 16.4 parts by weight of a pre-polymer melamine-formaldehyde (aqueous solution at 50% by pre-polymer weight) are then added to the mixture drop by drop. The reactive environment is then heated to a temperature of 90° C. and mixed at a speed of at least 15 m·s$^{-1}$ for 4 hours.

A slurry formed of microcapsules of thermochromic pigment dispersed in an aqueous solvent is obtained, the microcapsules having a diameter d90 of 4.6 µm, determined using a Zetasizer Nano ZS system by Malvern Instruments with an illumination at 632 nm.

The thermochromic pigment microcapsules obtained change color from blue to colorless above 48° C. with a color hysteresis effect.

TABLE 2

Transition temperatures of the prepared thermochromic pigment microcapsules

| | Change in color from color to colorless | T1 (° C.) | T2 (° C.) | T3 (° C.) | T4 (° C.) | $T_H$ (° C.) | $T_G$ (° C.) | ΔH |
|---|---|---|---|---|---|---|---|---|
| Thermochromic pigment microcapsules containing the compound (3) | Blue → colorless | 15 | 20 | 35 | 48 | 17 | 42 | 25 |

The transition temperatures measured are the following:
T1: complete recoloration temperature
T2: partial recoloration temperature
T3: partial discoloration temperature
T4: total discoloration temperature $$T_H = \frac{T1+T2}{2},$$

$$T_S = \frac{T3+T4}{3},$$

ΔH=hysteresis range=$T_G$−$T_H$

The invention claimed is:

1. A thermochromic pigment composition comprising:
(A) at least one electron-donor dye compound,
(B) at least one electron-acceptor compound, and
(C) at least one compound serving as a reaction medium capable of bringing about a reversible electron-acceptance/donation reaction attributable to compounds (A) and (B), the at least one compound corresponding to the following formula (I):

(I)

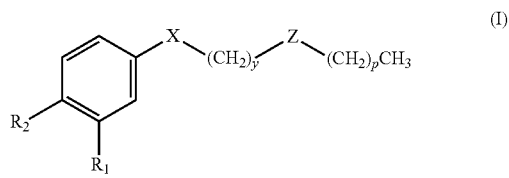

in which:
X represents O or a single bond,
Z represents COO or OCO,
R$_1$ represents O-alkyl or (CH$_2$)$_m$CH$_3$,
R$_2$ represents OCO(CH$_2$)$_n$CH$_3$ or H,
y=0-3, m=12-18,
n=12-18,
p=8-18, and
in the condition that when X is O, y does not equal 0, wherein the at least one electron-donor dye compound is present at from 1% to 10% by weight, wherein the at least one electron-acceptor compound is present at from 1% to 10% by weight, and wherein the at least one compound corresponding to the following formula (I) is present at from 70% to 98% by weight based on the total weight of the composition.

2. The thermochromic composition according to claim 1, wherein the at least one compound of the formula (I) corresponds to the following formula ($I_a$):

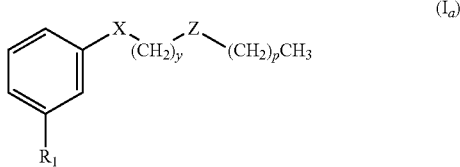

in which:
X represents O or a single bond,
Z represents COO or OCO,
$R_1$ represents O—$C_{1-6}$alkyl or $(CH_2)_mCH_3$,
y=0-3,
m=12-18, and
p=8-18.

3. The thermochromic composition according to claim 2, wherein the at least one compound of the formula ($I_a$) is a compound in which:
X represents a single bond,
Z represents OCO,
$R_1$ represents $(CH_2)_mCH_3$,
y=0,
m=12-18, and
p=8-18.

4. The thermochromic composition according to claim 1, wherein the compound (A) is selected from the group consisting of 3-(4-diethylamino-2-ethoxyphenyl)-3-(1-ethyl-2-methylindol-3-yl)-4-azaphthalide (Blue 63), 2'-(dibenzylamino)-6'-(diethylamino)fluorane, N,N-dimethyl-4-[2-[2-(octyloxy)phenyl]-6-phenyl-4-pyridinyl]benzenamine (Yellow CK37), 7-(4-diethylamino-2-hexyloxyphenyl)-7-(1-ethyl-2-methyl-1H-indol-3-yl)-7H-furo[3,4-b]pyridine-5-one (Blue 203), 2-(2,4-dimetylphenylamino)-3-methyl-6-diethylaminofluoran (Black 15), and 3,3-bis-(1-butyl-2-methyl-indol-3-yl)-3H-isobenzofuran-1-one (Red 40).

5. The thermochromic composition according to claim 1, wherein the compound (B) is selected from the group consisting of 2,2-bis(4-hydroxy-3-methylphenyl)propane (Bisphenol C), 4-hexyl-1,3-dihydrxybenzene (4-hexylresorcinol), 4,4'-cyclohexylidene bisphenol (BPZ), 4,4'-(1-phenylethylidene)bisphenol, 2,2'-dihydroxybiphenyl, 4,4'-(1,4-phenylenediisopropylidene)bisphenol, 1,1-bis(4-hydroxy-3-methylphenyl)cyclohexane, 9,9-bis(4-hydroxyphenyl)fluorene, 4,4'-(1,3-phenylenediisopropylidene)bisphenol, 1,1,1-tris(4-hydroxyphenyl)ethan, 4,4'-(2-ethylhexylidene)diphenol, and α,α,α'-tris(4-hydroxyphenyl)-1-ethyl-4-isopropylbenzene.

6. A thermochromic pigment microcapsule containing the thermochromic pigment composition according to claim 1.

7. An ink composition containing a plurality of the thermochromic pigment microcapsule according to claim 6.

8. A writing instrument containing the ink composition according to claim 7.

9. The writing instrument according to claim 8, wherein the writing instrument is a friction erasable ballpoint ink pen.

* * * * *